United States Patent
Eberlein et al.

(10) Patent No.: US 10,693,989 B2
(45) Date of Patent: Jun. 23, 2020

(54) BROKERING SERVICES FROM PARTNER CLOUD PLATFORMS

(71) Applicant: SAP SE, Walldorf (DE)

(72) Inventors: Peter Eberlein, Malsch (DE); Momchil Atanasov, Veliko Tarnovo (BG); Martina Galabova, Sofia (BG)

(73) Assignee: SAP SE, Walldorf (DE)

( * ) Notice: Subject to any disclaimer, the term of this patent is extended or adjusted under 35 U.S.C. 154(b) by 128 days.

(21) Appl. No.: 15/581,418

(22) Filed: Apr. 28, 2017

(65) Prior Publication Data
US 2018/0316772 A1    Nov. 1, 2018

(51) Int. Cl.
*H04L 29/08*    (2006.01)

(52) U.S. Cl.
CPC .......... *H04L 67/2809* (2013.01); *H04L 67/10* (2013.01); *H04L 67/16* (2013.01); *H04L 67/32* (2013.01)

(58) Field of Classification Search
CPC ...... H04L 67/2809; H04L 67/16; H04L 67/32
See application file for complete search history.

(56) References Cited

U.S. PATENT DOCUMENTS

| | | |
|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,894,602 B2 | 2/2011 | Mueller et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |

(Continued)

OTHER PUBLICATIONS

U.S. Appl. No. 14/960,983, filed Dec. 7, 2015, Eberlein, et al.

(Continued)

*Primary Examiner* — Philip J Chea
*Assistant Examiner* — Wuji Chen
(74) *Attorney, Agent, or Firm* — Fish & Richardson P.C.

(57) ABSTRACT

A Proxy Service Broker on a Hoster Platform as a Service (PaaS) receives a request for a Service Catalog including PaaS services available from a Partner PaaS. Using the Proxy Service Broker, creation of an instance of a Partner PaaS service selected from the Service Catalog is initiated. Using the Proxy Service Broker, a call is transmitted to a Partner Service Broker on the Partner PaaS to create the instance of the Partner PaaS service executing on the Partner PaaS. An Application is deployed on the Hoster PaaS to consume the instance of the Partner PaaS service. The deployed Application is bound with the instance of the Partner PaaS service and directly consumes the bound Partner PaaS service.

17 Claims, 5 Drawing Sheets

(56) References Cited

U.S. PATENT DOCUMENTS

| | | |
|---|---|---|
| 8,467,817 B2 | 6/2013 | Said et al. |
| 8,479,187 B2 | 7/2013 | Driesen et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,606,794 B1* | 3/2017 | Chou ................ G06F 3/04842 |
| 9,724,757 B2 | 8/2017 | Barrett |
| 2008/0120129 A1 | 5/2008 | Seubert et al. |
| 2010/0003972 A1* | 1/2010 | Little ................ G06Q 30/0241 |
| | | 455/418 |
| 2010/0131624 A1* | 5/2010 | Ferris .................... G06F 9/5072 |
| | | 709/221 |
| 2010/0332262 A1* | 12/2010 | Horvitz ................ G06F 9/5027 |
| | | 705/4 |
| 2011/0016214 A1* | 1/2011 | Jackson ................ G06F 9/5044 |
| | | 709/226 |
| 2011/0138047 A1* | 6/2011 | Brown .................. G06Q 10/10 |
| | | 709/226 |
| 2012/0084357 A1* | 4/2012 | Richards ................ G06F 9/541 |
| | | 709/204 |
| 2013/0325672 A1 | 12/2013 | Odenheimer et al. |
| 2013/0332424 A1 | 12/2013 | Nos et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0129303 A1* | 5/2014 | Aiglstorfer ........ G06Q 30/0241 |
| | | 705/14.4 |
| 2014/0164963 A1 | 6/2014 | Klemenz et al. |
| 2014/0325069 A1 | 10/2014 | Odenheimer et al. |
| 2014/0379677 A1 | 12/2014 | Driesen et al. |
| 2015/0006608 A1 | 1/2015 | Eberlein et al. |
| 2015/0067171 A1* | 3/2015 | Yum .................... G06F 9/5072 |
| | | 709/226 |
| 2015/0100546 A1 | 4/2015 | Eberlein et al. |
| 2015/0178332 A1 | 6/2015 | Said et al. |
| 2015/0304240 A1* | 10/2015 | Mandaleeka ......... G06F 9/5072 |
| | | 709/226 |
| 2017/0025441 A1 | 1/2017 | Mori |
| 2017/0097818 A1* | 4/2017 | Heine ...................... G06F 8/65 |
| 2018/0115468 A1* | 4/2018 | Bildhauer ........... H04L 67/2809 |
| 2018/0145884 A1* | 5/2018 | Stefanov ................ H04L 67/10 |
| 2018/0146049 A1* | 5/2018 | Africa ................... H04L 67/16 |
| 2018/0205600 A1* | 7/2018 | Burton ................ H04L 67/1097 |
| 2018/0217871 A1* | 8/2018 | Doshi .................... G06Q 30/04 |
| 2018/0225732 A1* | 8/2018 | Doshi .................... G06Q 30/06 |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/356,190, filed Nov. 18, 2016, Eberlein, Peter.

* cited by examiner

BROKERING SERVICES FROM PARTNER CLOUD PLATFORMS

BACKGROUND

The value of a cloud-computing Platform as a Service (PaaS) is determined by offered services. However, not all offered PaaS services need to be owned by a PaaS-hosting cloud provider (Hoster). For example, a Hoster can partner with one or more other PaaS-hosting cloud providers (Partners) and resell PaaS services as part of a full PaaS service portfolio. In such a scenario, it is mandatory that consumption of the Hoster's PaaS services and those from the Partners is seamless to a PaaS user. In order to ensure the seamlessness, the PaaS user must not be required to sign up with a Partner's cloud platform, to log on to that platform to browse or buy PaaS services, or to perform other actions on the Partner's PaaS. Instead, Partner PaaS services are brokered by the Hoster's PaaS, although not necessarily run by the Hoster's PaaS. This is because a Partner PaaS service can be consumed over the Internet directly from the Partner's PaaS.

SUMMARY

The present disclosure describes seamless provision of Hoster- and Partner-provided cloud-computing Platform as a Service (PaaS) services to users.

In an implementation, a Proxy Service Broker on a Hoster Platform as a Service (PaaS) receives a request for a Service Catalog including PaaS services available from a Partner PaaS. Using the Proxy Service Broker, creation of an instance of a Partner PaaS service selected from the Service Catalog is initiated. Using the Proxy Service Broker, a call is transmitted to a Partner Service Broker on the Partner PaaS to create the instance of the Partner PaaS service executing on the Partner PaaS. An Application is deployed on the Hoster PaaS to consume the instance of the Partner PaaS service. The deployed Application is bound with the instance of the Partner PaaS service and directly consumes the bound Partner PaaS service.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, seamless provision of PaaS-hosting cloud provider (Hoster)- and other PaaS-hosting cloud provider (Partner)-provided PaaS services to users can reduce network latency and can increase computer system throughput. Second, more Partner PaaS services are made available for use (for example, by service-consuming developers). Third, by providing each service consumer with a dedicated service instance, not multiplexing multiple consumers into one shared service instance, data security is protected when service consumers upload contextual data required for particular PaaS services. Fourth, the described approach avoids the use of a single dedicated service user to execute Partner PaaS services. This approach helps to prevent PaaS service locking for multiple service consumers in a scenario where a service application programming interface (API) key, username, or password associated with the dedicated PaaS service user becomes locked. Additionally, the described approach prevents the necessity of all service consumers sharing throttling rules applied to a dedicated PaaS service user used to access a Partner PaaS service. Fifth, the described seamless provisioning removes the need for a Hoster to track billing for each service consumer, as the Partner PaaS service provider can distinguish individual users and bill the Hoster appropriately. Sixth, the described approach allows access to PaaS services that would normally be inaccessible to users due to the need for access to an actual service API key. Seventh, the described approach can reduce a total cost of ownership (TCO) for a Hoster. Eighth, an identical consumption model exists between Hoster- and Partner-hosted services. To a consumer, accessing services is seamless. From a consumer perspective, regardless of whether a Hoster or a Partner provides a service, the process steps appear the same for finding the service in a service catalog, creating a service instance for consumption, binding the service to retrieve access credentials, calling the service, and billing for the service. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes seamless provision of cloud-computing Platform as a Service (PaaS) services to users, and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

The value of a PaaS is determined by offered services. However, not all offered PaaS services need to be owned by a PaaS-hosting cloud provider (Hoster). For example, a Hoster can partner with one or more other PaaS-hosting cloud providers (Partners) and resell PaaS services as part of a full PaaS service portfolio. In such a scenario, it is mandatory that consumption of the Hoster's PaaS services and those from the Partners is seamless to a PaaS user. In order to ensure the seamlessness, the PaaS user must not be required to sign up with a Partner's cloud platform, to log on to that platform to browse or buy PaaS services, or to perform other actions on the Partner's PaaS. Instead, Partner PaaS services are brokered by the Hoster's PaaS, although not necessarily run by the Hoster's PaaS. This is because a Partner PaaS service can be consumed over the Internet directly from the Partner's PaaS.

Figure 1:
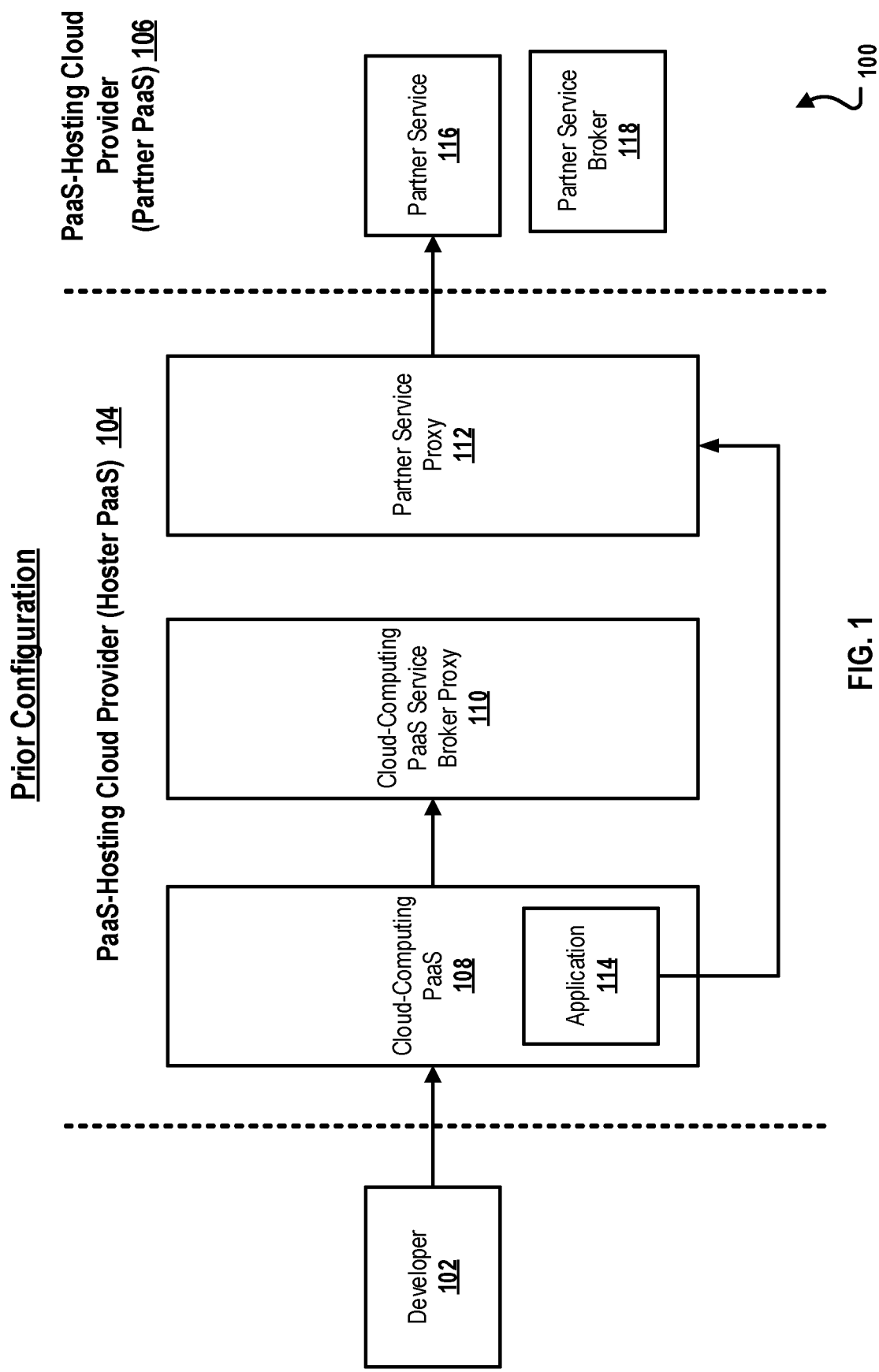
FIG. 1 is a block diagram illustrating an example prior Platform as a Service (PaaS) system using a Partner Service Broker Proxy and an instance of a Partner Service in a many-to-one configuration, according to an implementation.

FIG. 1 is a block diagram illustrating an example prior PaaS system 100 using a Partner Service Broker Proxy and an instance of a Partner Service in a many-to-one configuration, according to an implementation. In the illustrated implementation, PaaS system 100 includes a developer 102, a Hoster PaaS 104, and a Partner PaaS 106. For example, one or more elements of the Hoster PaaS 304 and the Partner PaaS 306 can be provided by CLOUD FOUNDRY or other cloud-computing platform technologies. The Hoster PaaS 104 includes a Cloud-Computing PaaS 108 (for example, the SAP CLOUD PLATFORM using CLOUD FOUNDRY technologies), a Cloud-Computing PaaS Service Broker Proxy 110 (for example, using CLOUD FOUNDRY technologies), and a Partner Service Proxy 112. In the Hoster PaaS 104, the Cloud-Computing PaaS 108 includes an Application 114 communicating with Partner Service Proxy 112. The Partner PaaS 106 includes one or more Partner PaaS services (Partner Services) 116.

In PaaS system 100, a single account is provided by the Partner PaaS 106 with access to one instance of each available Partner Service 116. In other words, one set of credentials per Partner Service 116 instance type is used to call Partner Service 116. As each Application 114 receives its own set of credentials issued by the Cloud-Computing PaaS Service Broker Proxy 110, these credentials need to be replaced with the credentials from Partner Service 116. Therefore, each service invocation must go through Partner Service Proxy 112.

Figure 2:
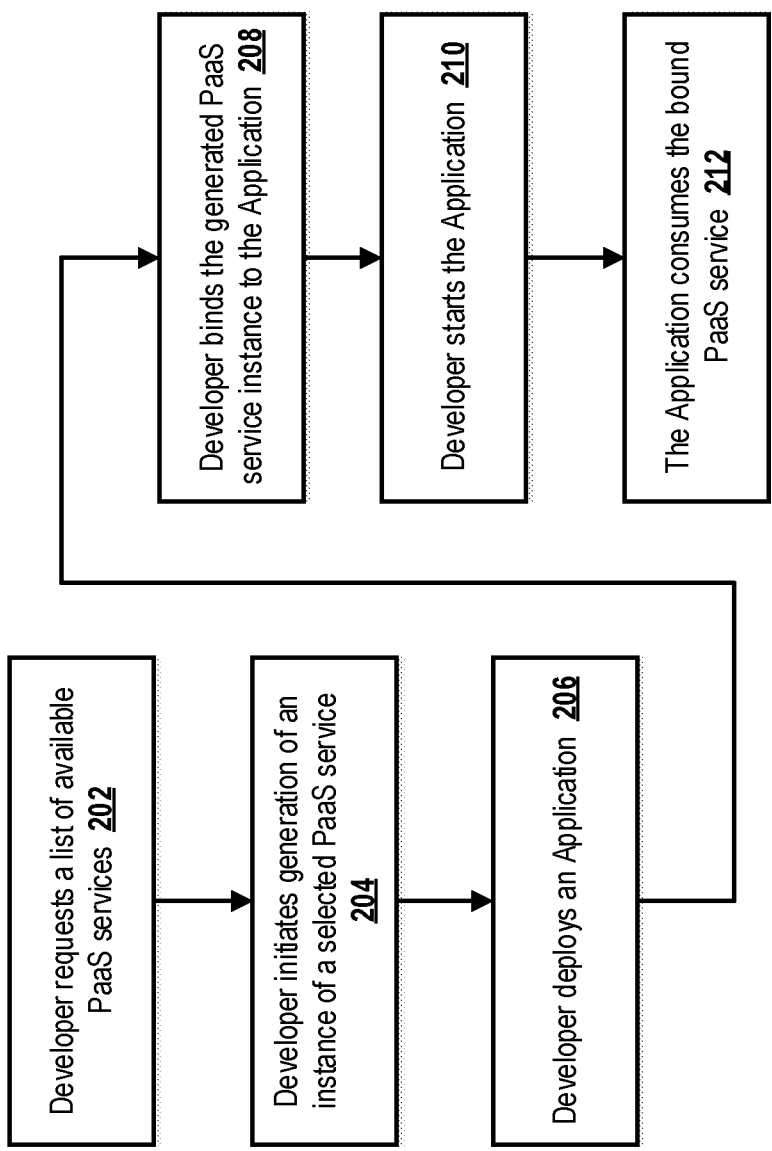
FIG. 2 is a flowchart of an example method associated with the example prior PaaS system of FIG. 1, according to an implementation.

FIG. 2 is a flowchart of an example method 200 associated with the example conventional PaaS system 100, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware, as appropriate. In some implementations, various steps of method 200 can be run in parallel, in combination, in loops, or in any order.

At 202, a Developer 102 requests a list of available PaaS services (for example, PaaS services available from a Partner PaaS. For example, in an implementation, the Developer 102 could use a "cf marketplace" command and receive a list of available PaaS services from the Cloud-Computing PaaS 108, which keeps a record of available services (every service broker registers with the Cloud-Computing PaaS 108). From 202, method 200 proceeds to 204.

At 204, the Developer 102 initiates generation of an instance of a selected PaaS service (for example, a Partner Service 116) offered by the Partner PaaS. For example, in an implementation, the Developer 102 could use a "cf create-service analyzer default my-service" command to generate an instance of an "analyzer" PaaS service under the name "my-service." The command is received by the Cloud-Computing PaaS 108 of the Hosting PaaS 104. The command is forwarded to the Cloud-Computing PaaS Service Broker Proxy 110 which creates a virtual entry in its database to keep a record of the developer space in which the service instance was created so that only developers associated with the developer space can work with the specific instance. From 204, method 200 proceeds to 206.

At 206, the Developer 102 deploys an Application 114 on the Cloud Computing PaaS 108. The Application is configured to consume the generated instance of the selected PaaS service. For example, the Developer 102 can deploy an Application 114 named my-app. From 206, method 200 proceeds to 208.

At 208, the Developer 102 binds the generated PaaS service instance to the deployed Application 114. For example, in an implementation, the Developer 102 can use a "cf bind-service my-app my-service" command to bind "my-service" to the application "my-app." Another virtual entry describing the binding is created in the Cloud-Computing PaaS Service Broker Proxy 110 database.

Additionally, a set of credentials is generated that has a similar signature to one that would normally be generated by an actual PaaS service. The provided set of credentials typically contains some form of authentication (for example, a username/password or API key plus, additionally, an endpoint (that is, an address like a URL), and possibly other information). For example, if the service is a database service, it might contain a technical user, the password for the user, the IP address of the database, and additionally a schema name. What is meant by "similar signature" is that the structure would be similar as for a real service (for example, if it is a database service, it also contains username/password, IP address, and schema name) but the concrete values will be different, at least for authentication information and the address. This is because the address is the address of the service proxy 112 and the authentication information is issued by the service proxy 112. When the application performs the service call at a later time, it will go to the service proxy 112 (because this is what was put into the address) and the service proxy 112 will first authenticate the application but then replace this information with its own credentials, which are accepted by the real partner service 116. In this way, the partner service 116 knows just about one consumer (the service proxy 112) but the service proxy 112 multiplexes this to multiple consumers. The Cloud-Computing PaaS Service Broker Proxy 110 returns a payload (for example, in a JSON or other format) matching a format provided by a Partner Service Broker 118 (initially invoked once by an operator to set up deployment) and containing, for example, an internally generated username/password and a service URL that points to the Partner Service Proxy 112. However, the actual values returned by the Cloud-Computing PaaS Service Broker Proxy 110 are different from the ones returned by the Partner Service Broker 118 as the service URL is adjusted to point to the Partner Service Proxy 112 and a new username/password are created. From 208, method 200 proceeds to 210.

At 210, the developer starts the Application 114 (for example, "my-app"). From 210, method 200 proceeds to 212.

At 212, the Application 114 consumes the bound PaaS service (for example, my-service). To consume the bound PaaS service, the Application 114 uses the provided URL and credentials (for example, username, and password) to call the bound PaaS service. In more detail, the call is received by the Partner Service Proxy 112. The Partner Service Proxy 112 verifies that the passed in credentials (for example, username and password) are valid (for example, generated by the Cloud-Computing PaaS Service Broker Proxy 110. If the credentials are determined to be valid, the Partner Service Proxy 112 substitutes the username/password with an actual username/password provided by the Partner and forwards the call to the generated instance of the Partner Service 116. After 212, method 200 stops.

In light of FIGS. 1-2, the described PaaS system 100 has drawbacks. Example drawbacks can include, but are not limited to:

- A higher total cost of ownership (TCO) for the Hoster,
- A lower performance/throughput exists due to the Partner Service Proxy 112 managing and forwarding requests,
- Developers 102 are able to use only a small portion of available Partner services 116. This is because some Partner Services 116 depend upon context data being uploaded by consumers. Since the same service instance is re-used, the use of these particular Partner Services 116 would result in all service consumers sharing similar data,
- If the used credentials (for example, a username and password) become locked, the associated Partner Service 116 would become unavailable for all service consumers,
- All service consumers are channeled through a service single user and share any throttling (or other rules) implemented by the Partner PaaS,
- There is a need for the Hoster to track billing information as the Partner receives requests from the same origin and using the same credentials—it is not possible to differentiate between different service consumers on the Hosting PaaS, and
- Service consumers are not able to use, for example, Partner tools that require access to actual credentials.

Figure 3:
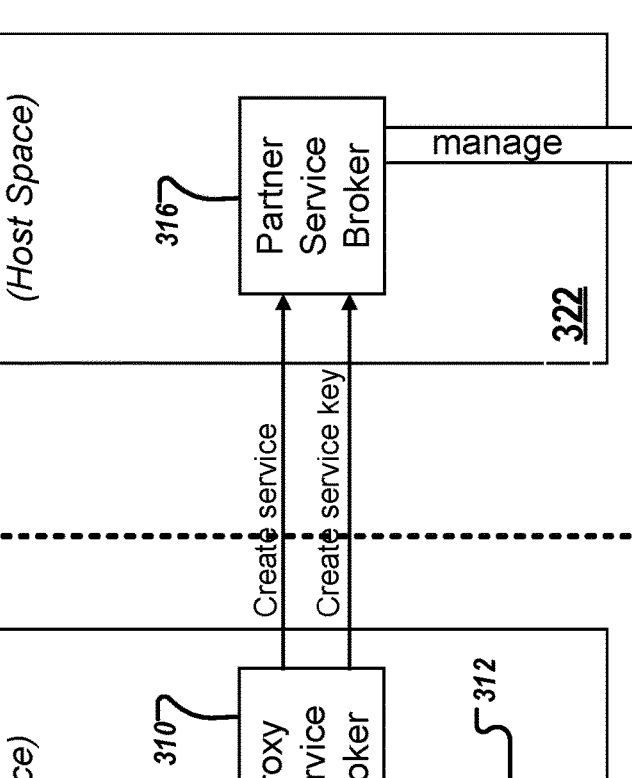
FIG. 3 is a block diagram illustrating an example enhanced PaaS system using a Hoster Service Broker Proxy and a Partner Service Broker in a one-to-one configuration, according to an implementation.

FIG. 3 is a block diagram illustrating an example enhanced PaaS system 300 using a Hoster Service Broker Proxy and a Partner Service Broker in a one-to-one configuration, according to an implementation. Described is an approach for seamless provision of Hoster- and Partner-provided PaaS services to users. For consumption of PaaS services (for example, cognitive or other PaaS services), a customer of a Hoster's PaaS services need to only interact with the Hoster's PaaS. At a high-level, a Hoster PaaS Service Broker maps PaaS service creation and binding calls to similar calls on a Partner PaaS. A service user is created within the Partner PaaS. A Partner PaaS Cloud Controller API is used to issue PaaS service management commands matching requests issued by service consumers interfacing with the Hoster PaaS.

In the illustrated implementation, PaaS system 300 includes a developer 302 (for example, a developer 102 as in FIGS. 1-2), a Hoster PaaS 304, and a Partner PaaS 306. For example, one or more elements of the Hoster PaaS 304 and the Partner PaaS 306 can be provided by CLOUD FOUNDRY or other cloud-computing platform technologies.

The Hoster PaaS 304 includes a Database Service Broker 308, Proxy Service Broker 310, Application 312, and Database Service 314. Note that the illustrated Database Service Broker 308/Database Service 314 are not necessary for the described concept and are introduced into the disclosure as an example for the purpose of understanding and of demonstrating similarities and differences of consumption between the Database Service 314 and a Partner Service 318. From a developer/consumer perspective, everything behaves identically with respect to consumption of the example Database Service 314 and a Partner Service 318. In other words, the Database Service Broker 308/Database Service 314 could be removed from the disclosure and the description focused on consumption of the Partner Service 318.

In the Hoster PaaS 304, each Developer 302 is provided a Developer Space 320, an isolated environment in which a developer can deploy applications, create service instances, and bind service instances to applications. Different Developer Spaces are isolated from each other so that applications and service instances are accessible only to those developers that have access to a respective Developer Space. Each Developer Space 320 interfaces with the Database Service 314. The Database Service Broker 308 manages the Database Service 314. The Database Service Broker 308 creates a database schema for a developer when a service instance is requested and provides an address of the database and accesses credentials to the schema when binding the requested service instance. The Application 312 communicates with the Database Service 314 for data and functions related to data persistence (reading/writing data).

In typical implementations, the Database Service 314 is provided by an in-memory database (for example, SAP HANA or other in-memory database). In other implementations, the Database Service 314 can be provided by a conventional database, a combination of in-memory and conventional databases, or other database configuration consistent with this disclosure.

The Partner PaaS 306 includes a Partner Service Broker 316 and a Partner Service 318. In the Partner PaaS 306, each Hoster is provided a Host Space 322 used to isolate different partners from each other. One Host Space 322 could be used for all previously-described Developer Spaces 320 or one Host Space 322 could be created for each Developer Space 320. Using one shared Hoster Space 322 is easier to implement, as additional Host Spaces 322 do not need to be created on the Partner side for each Developer Space 320 on the Hoster side. However, separating Hoster Spaces 322 provides more control (for example, assigning a quota on a Hoster Space 322 to limit resource consumption for each Developer Space 320).

The Partner Service Broker 316 in each Host Space 316 manages (for example, create, update, and delete service instances and credentials) one or more Partner Services 318. The Application 312 can directly communicate with a generated instance of a Partner Service 318 (for example, using an Internet or other connection). In some implementations in the illustrated example of FIG. 3, the Partner PaaS 306 can be configured to provide PaaS services including, among other things, machine learning and cognitive computing (for example, image recognition and sentiment analysis).

In the described enhanced approach and at a high-level, the Proxy Service Broker 310 on the Hoster PaaS 304 is used to map PaaS service creation and binding calls to similar calls on the Partner PaaS 306. For example, a service user can be created within the Partner PaaS 306. Using an exposed Partner PaaS CLOUD FOUNDRY-based cloud controller API, PaaS service management commands can be issued within the Partner PaaS 306 that match commands issued by developers in the Hoster PaaS 304. For each Developer Space 320, the Proxy Service Broker 310 can request creation of an instance of the Partner Service 318 and an associated service key from the Partner Service Broker 316 in the Host Space 322. The service key is then used on the side of the PaaS-Hosting Cloud Provider 304 to bind the service instance for which this key was created to the Application 312.

Figure 4:
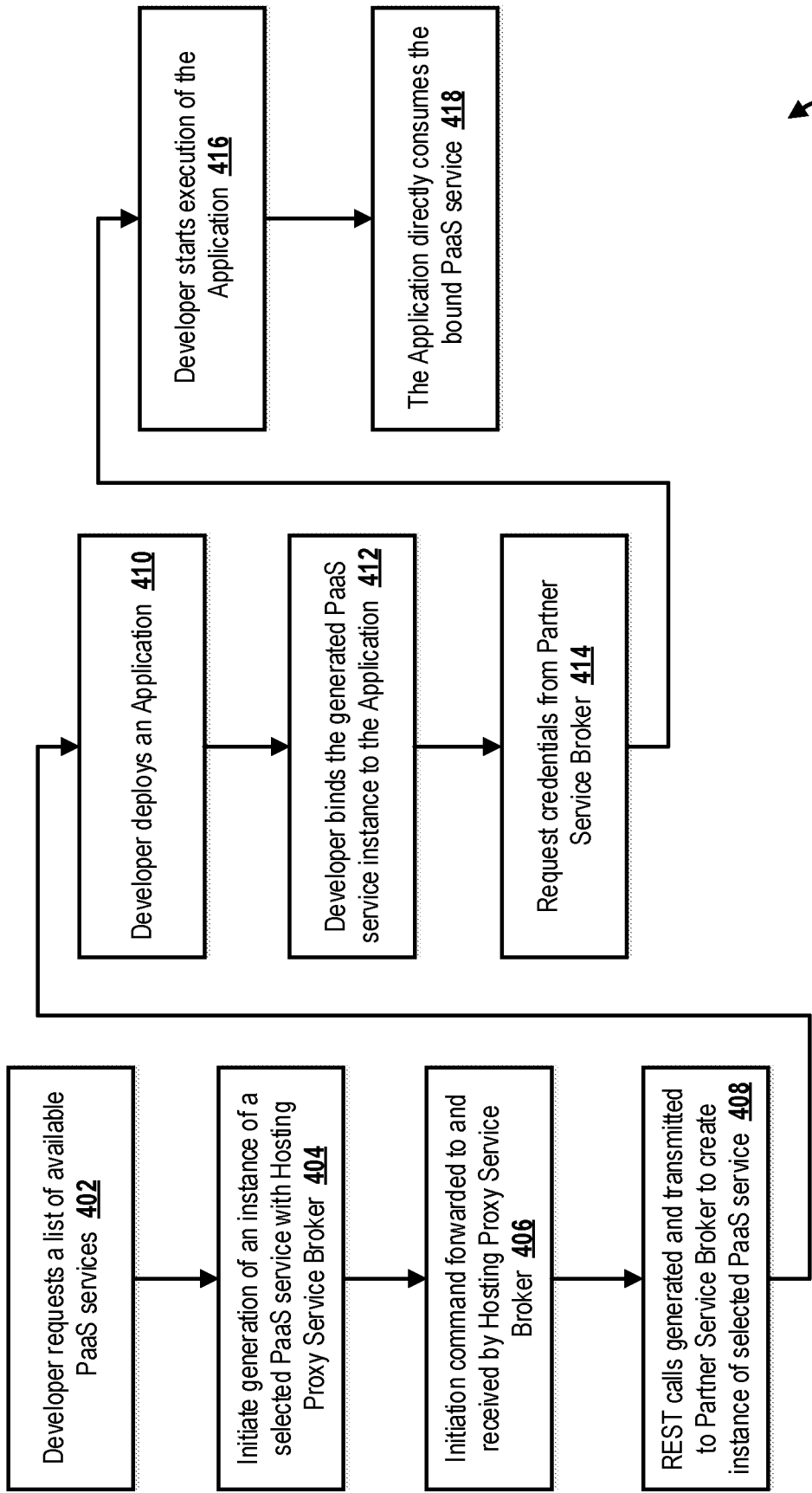
FIG. 4 is a flowchart of an example method associated with the example enhanced PaaS system of FIG. 3, according to an implementation.

FIG. 4 is a flowchart of an example method 400 associated with the example enhanced PaaS system of FIG. 3, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order. In the description of method 400 a Developer 302 would like to deploy an Application 312 on the Hoster PaaS 304 that consumes an "Analyzer" PaaS service.

At 402, a Developer 302 requests a list (that is a Service Catalog) of available PaaS services (for example, PaaS services available from the Partner PaaS 306 (label "(1) Get services"). For example, in an implementation, the Developer 102 could issue a "cf marketplace" command in the context of the Developer Space 320 and receive a returned list of available PaaS services. Note that there are no calls made to the Partner PaaS 306. During an initial registration of the Proxy Service Broker 310, data associated with PaaS services to be made available from the Partner PaaS 306 is stored within the Hoster PaaS 304 (in a Cloud Controller (not illustrated)—a core component of the CLOUD FOUNDRY PaaS) for retrieval.

In an implementation, the Service Catalog can be provided to the Hoster PaaS 304 using steps similar to:
- list all services available in the Partner PaaS Host Space 322 (for example, using a command similar to "/v2/spaces/<space guid>/services",
- store with the Proxy Service Broker 310 (for example, in-memory) the returned service and plan names, and
- obtain and store with the Proxy Service Broker 310 (for example, in memory) Partner PaaS 306 Global Unique Identifiers (GUIDs) needed for PaaS service instance creation (for example, using a command similar to "/v2/services/<service guid>/service_plans." This information will be used by the Proxy Service Broker 310 when a request is made to instantiate a PaaS service instance.

Note that for data stored in memory with the Proxy Service Broker 310, if the Proxy Service Broker 310 goes down, a call can be made to the Partner Service Broker 316 to re-obtain this information to put back into memory. Also, the data can be stored in a database (for example, service, plan names, and corresponding GUIDs) for retrieval if necessary.

In some instances, the Service Catalog needs to be restricted, so the Proxy Service Broker 310 is configured to only expose particular PaaS services. Methods of accomplishing the restriction include, but are not limited to, white-listing the PaaS services or filtering the PaaS services by tag. From 402, method 400 proceeds to 404.

At 404, in the same way as the Developer 302 can initiate creation of an instance of a Database Service 314 provided by the Hoster PaaS 304 itself (which is not discussed in this flowchart description), the Developer 302 initiates creation (label "(2) Create service"), using Proxy Service Broker 310, of an instance of a selected PaaS service (for example, a Partner Service 318) offered by the Partner PaaS 306. For example, in an implementation, the Developer 102 could issue a "cf create-service analyzer default my-service" command to create an instance of an "analyzer" PaaS service under the name "my-service." From 404, method 400 proceeds to 406.

At 406, the issued creation command is forwarded to and received by the Proxy Service Broker 310 within the Developer Space 320 associated with the Developer 302. From 406, method 400 proceeds to 408.

At 408, the Proxy Service Broker 310 generates and transmits Representational State Transfer (REST) calls (for example, Representational State Transfer (REST) calls) to communicate with the Partner Service Broker 316 using the service user. For example, the Proxy Service Broker 310 can requests creation of an "analyzer" service similar to the request at 404 by the Developer 302 to create the PaaS service. An example set of commands could include:
- cf api <partner-cf-url>
- cf login <technical-user> <technical-user-password>
- cf create-service analyzer default <SERVICE-NAME-GUID>. Note that the "SERVICE-NAME-GUID" value is created by the Proxy Service Broker 310 to avoid name clashes on the Partner PaaS 306 due to the use of the single service user to generate and transmit the REST calls. Internally, the Proxy Service Broker 310 retains a mapping of services it provides to those it has created remotely. Another simplified approach could use a service GUID that is passed by a cloud controller of the Hoster PaaS 304 as the service name GUID. In this way, a mapping need not be stored by the Hoster PaaS 304 and removing the needs for a storage database. From 408, method 400 proceeds to 410.

At 410, Developer 302 deploys an Application 312 on the Hoster PaaS 304 (label "(3) Push app"). The Application 312 is configured to consume a generated instance of the selected PaaS service. For example, the Developer 302 can deploy an Application 312 named my-app. From 410, method 400 proceeds to 412.

At 412, in the same way as the Developer 302 can bind an instance of a Database Service 314 provided by the Hoster PaaS 304 itself (which is not discussed in this flowchart description), the Developer 302 binds the created PaaS service instance to the deployed Application 312 (label "(4) Bind service"). For example, in an implementation, the Developer 302 can use a "cf bind-service my-app my-service" command to bind "my-service" to the application "my-app." From 412, method 400 proceeds to 414.

At 414, the Proxy Service Broker 310 uses service keys to request credentials from the Partner PaaS 306 for the created PaaS service instance. For example, the Proxy Service Broker 310 uses calls (for example, REST calls) to the Partner PaaS 306. In an implementation, an example set of commands could include:
- cf api . . . ,
- cf login . . . ,
- cf create-service-key <SERVICE-NAME-GUID> <SERVICE-KEY-GUID>,
- cf service-key <SERVICE-NAME-GUID> <SERVICE-KEY-GUID>, and
- The SERVICE-KEY-GUID is needed to avoid clashes. Internally, the Broker Proxy should map the SERVICE-KEY-GUID to the developer's binding.

From 414, method 400 proceeds to 416.

At 416, the Developer 302 starts execution of the Application 416 (for example, "my-app") (label "(5) Start app"). From 416, method 400 proceeds to 418.

At 418, the Application 418 consumes the bound PaaS service (for example, my-service) directly (for example, over an Internet or other network connection). To a service consumer, it is as if the bound PaaS service had been created from within the Partner PaaS 306.

The described approach avoids the use of a single dedicated service user (as in FIGS. 1-2) to execute Partner PaaS services. Removing the use of a single dedicated service user helps to prevent PaaS service locking for multiple service consumers in a scenario where credentials (like for example, a username and password) associated with the dedicated PaaS service user becomes locked. The described approach also prevents the necessity of all service consumers sharing throttling rules applied to a dedicated PaaS service user used to access a Partner PaaS service. Moreover, additional Partner PaaS services that will not function with a single dedicated service user are made available for use by service consumers under the enhanced approach.

Further, network and computer system throughput is reduced with the removal of a dedicated proxy service managing and forwarding all requests. Data security is also protected when service consumers are able to upload contextual data to particular PaaS services. The contextual data can be used to distinguish and protect user data.

In the enhanced approach, a Hoster is also not required to track billing for each service consumer, as the Partner PaaS can distinguish individual users accessing an instance of a PaaS service and bill the Hoster appropriately. For this (and other) reason, the enhanced approach can reduce a Hoster's TCO. Service users are also allowed access to Partner PaaS services that would normally be inaccessible to users due to the need for access to actual credentials. After 418, method 400 stops.

Figure 5:
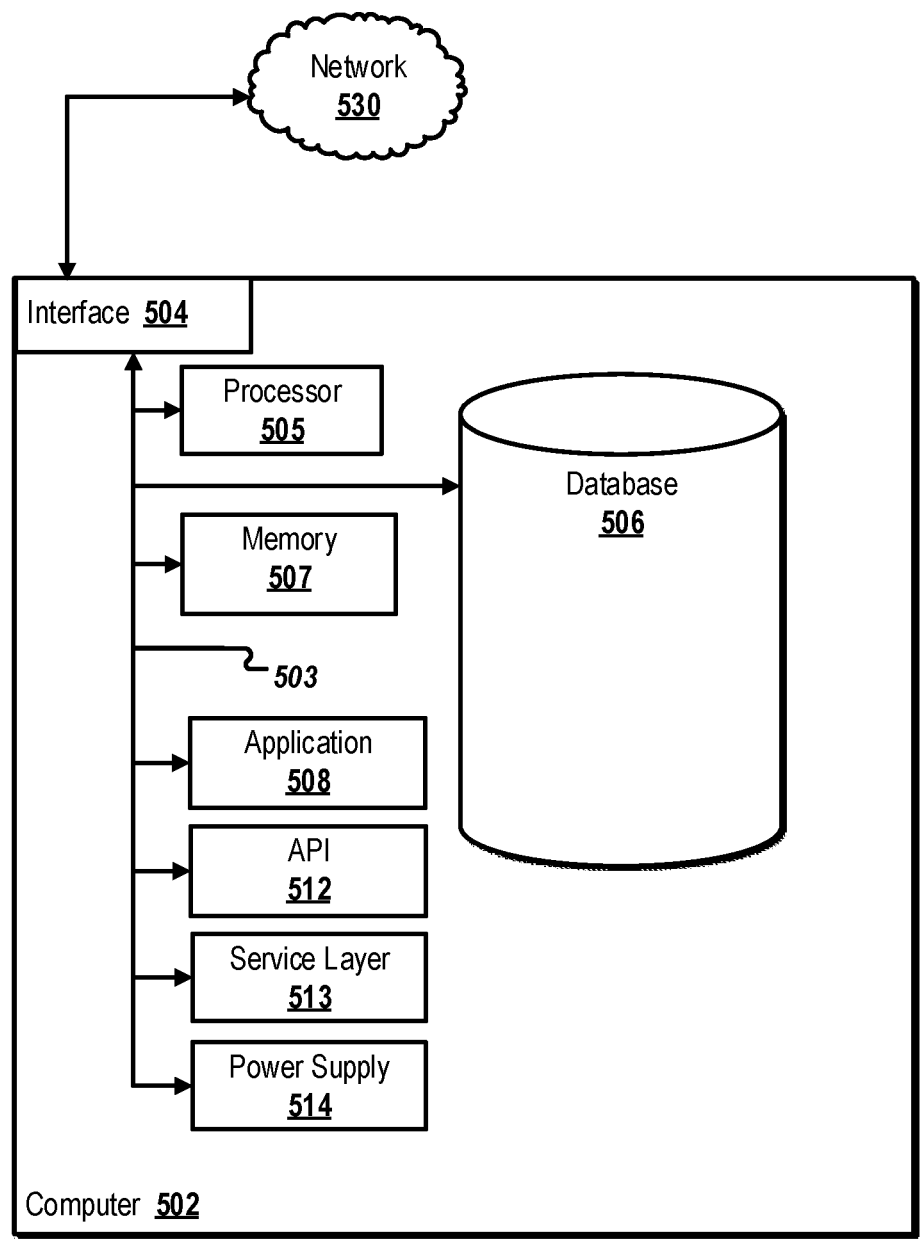
FIG. 5 is a block diagram illustrating an example computer system used to provide computational functionalities associated with described algorithms, methods, functions, processes, flows, and procedures as described in the instant disclosure, according to an implementation.

FIG. 5 is a block diagram of an example computer system 500 used to provide computational functionalities associated with described algorithms, methods, functions, processes, flows, and procedures, as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other server (or a combination of servers).

The computer 502 can receive requests over network 530 from a client application (for example, executing on another computer 502) and respond to the received requests by processing the received requests using an appropriate software application(s). In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, hardware or software (or a combination of both hardware and software), may interface with each other or the interface 504 (or a combination of both), over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems that are connected to the network 530 (whether illustrated or not) in a distributed environment. Generally, the interface 504 comprises logic encoded in software or hardware (or a combination of software and hardware) and is operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like, storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, or applications. Further, although illustrated as a single application 508, the application 508 may be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or other power management functionality). In some implementations, the power-supply 514 can include a power plug to allow the computer 502 to be plugged into a wall socket or other power source to, for example, power the computer 502 or recharge a rechargeable battery.

There may be any number of computers 502 associated with, or external to, a computer system containing computer 502, each computer 502 communicating over network 530. Further, the term "client," "user," and other appropriate terminology may be used interchangeably, as appropriate, without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method, comprising: receiving, at a Proxy Service Broker on a Hoster Platform as a Service (PaaS), a request for a Service Catalog including PaaS services available from a Partner PaaS; initiating creation, using the Proxy Service Broker, of an instance of a Partner PaaS service selected from the Service Catalog; transmitting, using the Proxy Service Broker, a call to a Partner Service Broker on the Partner PaaS to create the instance of the Partner PaaS service executing on the Partner PaaS; deploying an Application on the Hoster PaaS to consume the instance of the Partner PaaS service; binding the deployed Application with the instance of the Partner PaaS service; and directly consuming the bound Partner PaaS service with the deployed Application.

The foregoing and other described implementations can each, optionally, include one or more of the following features:

A first feature, combinable with any of the following features, wherein the Service Catalog of PaaS services is stored on and returned by the Proxy Service Broker.

A second feature, combinable with any of the previous or following features, wherein the Proxy Service Broker is associated with a Developer Space associated with the Hoster PaaS.

A third feature, combinable with any of the previous or following features, wherein the a unique service identifier for the created instance of the Partner PaaS service is created by the Proxy Service Broker to avoid name clashes on the Partner PaaS.

A fourth feature, combinable with any of the previous or following features, comprising transmitting, using the Proxy Service Broker, a call to the Partner Service Broker on the Partner PaaS to create a service key for the created instance of the Partner PaaS service.

A fifth feature, combinable with any of the previous or following features, wherein a single service user is used to transmit the call to create the instance of the Partner PaaS service and to create the service key for the created instance of the Partner PaaS service.

A sixth feature, combinable with any of the previous or following features, wherein the calls to the Partner PaaS from the Proxy Service Broker are Representational State Transfer (REST) calls.

In a second implementation, a non-transitory, computer-readable medium storing one or more instructions executable by a computer system to perform operations comprising: receiving, at a Proxy Service Broker on a Hoster Platform as a Service (PaaS), a request for a Service Catalog including PaaS services available from a Partner PaaS; initiating creation, using the Proxy Service Broker, of an instance of a Partner PaaS service selected from the Service Catalog; transmitting, using the Proxy Service Broker, a call to a Partner Service Broker on the Partner PaaS to create the instance of the Partner PaaS service executing on the Partner PaaS; deploying an Application on the Hoster PaaS to consume the instance of the Partner PaaS service; binding the deployed Application with the instance of the Partner PaaS service; and directly consuming the bound Partner PaaS service with the deployed Application.

The foregoing and other described implementations can each, optionally, include one or more of the following features:

A first feature, combinable with any of the following features, wherein the Service Catalog of PaaS services is stored on and returned by the Proxy Service Broker.

A second feature, combinable with any of the previous or following features, wherein the Proxy Service Broker is associated with a Developer Space associated with the Hoster PaaS.

A third feature, combinable with any of the previous or following features, wherein the a unique service identifier for the created instance of the Partner PaaS service is created by the Proxy Service Broker to avoid name clashes on the Partner PaaS.

A fourth feature, combinable with any of the previous or following features, further comprising one or more instructions executable to transmit, using the Proxy Service Broker, a call to the Partner Service Broker on the Partner PaaS to create a service key for the created instance of the Partner PaaS service.

A fifth feature, combinable with any of the previous or following features, wherein a single service user is used to transmit the call to create the instance of the Partner PaaS service and to create the service key for the created instance of the Partner PaaS service.

A sixth feature, combinable with any of the previous or following features, wherein the calls to the Partner PaaS from the Proxy Service Broker are Representational State Transfer (REST) calls.

In a third implementation, a computer-implemented system, comprising: a computer memory; and a hardware processor interoperably coupled with the computer memory and configured to perform operations comprising: receiving, at a Proxy Service Broker on a Hoster Platform as a Service (PaaS), a request for a Service Catalog including PaaS services available from a Partner PaaS; initiating creation, using the Proxy Service Broker, of an instance of a Partner PaaS service selected from the Service Catalog; transmitting, using the Proxy Service Broker, a call to a Partner Service Broker on the Partner PaaS to create the instance of the Partner PaaS service executing on the Partner PaaS; deploying an Application on the Hoster PaaS to consume the instance of the Partner PaaS service; binding the deployed Application with the instance of the Partner PaaS service; and directly consuming the bound Partner PaaS service with the deployed Application.

The foregoing and other described implementations can each, optionally, include one or more of the following features:

A first feature, combinable with any of the following features, wherein the Service Catalog of PaaS services is stored on and returned by the Proxy Service Broker.

A second feature, combinable with any of the previous or following features, wherein the Proxy Service Broker is associated with a Developer Space associated with the Hoster PaaS.

A third feature, combinable with any of the previous or following features, wherein the a unique service identifier for the created instance of the Partner PaaS service is created by the Proxy Service Broker to avoid name clashes on the Partner PaaS.

A fourth feature, combinable with any of the previous or following features, further configured to transmit, using the Proxy Service Broker, a call to the Partner Service Broker on the Partner PaaS to create a service key for the created instance of the Partner PaaS service.

A fifth feature, combinable with any of the previous or following features, wherein a single service user is used to transmit the call to create the instance of the Partner PaaS service and to create the service key for the created instance of the Partner PaaS service.

A sixth feature, combinable with any of the previous or following features, wherein the calls to the Partner PaaS from the Proxy Service Broker are Representational State Transfer (REST) calls.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11× and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, from a developer and at a Proxy Service Broker on a Hoster Platform as a Service (PaaS), a request for a Service Catalog comprising PaaS services available from a Partner PaaS, wherein the Proxy Service Broker on the Hoster PaaS brokers the PaaS services run by the Partner PaaS by mapping Partner PaaS service creation, and binding service calls to corresponding calls on the Partner PaaS;
   initiating creation, by the developer using the Proxy Service Broker, of an instance of a Partner PaaS service selected from the Service Catalog;
   generating, by the Proxy Service Broker, a unique service identifier for the instance of the Partner PaaS service to avoid name clashes on the Partner PaaS;
   transmitting, using the Proxy Service Broker, a call to a Partner Service Broker on the Partner PaaS to create the instance of the Partner PaaS service executing on the Partner PaaS;
   deploying, by the developer, an Application on the Hoster PaaS to consume the instance of the Partner PaaS service;
   binding, by the developer, the Application deployed on the Hoster PaaS to the instance of the Partner PaaS service executing on the Partner PaaS; and
   directly consuming the Partner PaaS service executing on the Partner PaaS and bound to the Application deployed on the Hoster PaaS by using Hoster PaaS consumer credentials and without requiring Partner PaaS consumer credentials.

2. The computer-implemented method of claim 1, wherein the Service Catalog of PaaS services is stored on and returned by the Proxy Service Broker.

3. The computer-implemented method of claim 1, wherein the Proxy Service Broker is associated with a Developer Space associated with the Hoster PaaS.

4. The computer-implemented method of claim 1, comprising transmitting, using the Proxy Service Broker, a call to the Partner Service Broker on the Partner PaaS to create a service key for the created instance of the Partner PaaS service.

5. The computer-implemented method of claim 4, wherein a single service user is used to transmit the call to create the instance of the Partner PaaS service and to create the service key for the created instance of the Partner PaaS service.

6. The computer-implemented method of claim 4, wherein the calls to the Partner PaaS from the Proxy Service Broker are Representational State Transfer (REST) calls.

7. A non-transitory, computer-readable medium storing one or more instructions executable by a computer system to perform operations comprising:
   receiving, from a developer and at a Proxy Service Broker on a Hoster Platform as a Service (PaaS), a request for a Service Catalog comprising PaaS services available from a Partner PaaS, wherein the Proxy Service Broker on the Hoster PaaS brokers the PaaS services run by the Partner PaaS by mapping Partner PaaS service creation, and binding service calls to corresponding calls on the Partner PaaS;
   initiating creation, by the developer using the Proxy Service Broker, of an instance of a Partner PaaS service selected from the Service Catalog;

generating, by the Proxy Service Broker, a unique service identifier for the instance of the Partner PaaS service to avoid name clashes on the Partner PaaS;

transmitting, using the Proxy Service Broker, a call to a Partner Service Broker on the Partner PaaS to create the instance of the Partner PaaS service executing on the Partner PaaS;

deploying, by the developer, an Application on the Hoster PaaS to consume the instance of the Partner PaaS service;

binding, by the developer, the Application deployed on the Hoster PaaS to the instance of the Partner PaaS service executing on the Partner PaaS; and directly consuming the Partner PaaS service executing on the Partner PaaS and bound to the Application deployed on the Hoster PaaS by using Hoster PaaS consumer credentials and without requiring Partner PaaS consumer credentials.

8. The non-transitory, computer-readable medium of claim 7, wherein the Service Catalog of PaaS services is stored on and returned by the Proxy Service Broker.

9. The non-transitory, computer-readable medium of claim 7, wherein the Proxy Service Broker is associated with a Developer Space associated with the Hoster PaaS.

10. The non-transitory, computer-readable medium of claim 7, further comprising one or more instructions executable to transmit, using the Proxy Service Broker, a call to the Partner Service Broker on the Partner PaaS to create a service key for the created instance of the Partner PaaS service.

11. The non-transitory, computer-readable medium of claim 10, wherein a single service user is used to transmit the call to create the instance of the Partner PaaS service and to create the service key for the created instance of the Partner PaaS service.

12. The non-transitory, computer-readable medium of claim 10, wherein the calls to the Partner PaaS from the Proxy Service Broker are Representational State Transfer (REST) calls.

13. A computer-implemented system, comprising:
a computer memory; and
a hardware processor interoperably coupled with the computer memory and configured to perform operations comprising:
receiving, from a developer and at a Proxy Service Broker on a Hoster Platform as a Service (PaaS), a request for a Service Catalog comprising PaaS services available from a Partner PaaS, wherein the Proxy Service Broker on the Hoster PaaS brokers the PaaS services run by the Partner PaaS by mapping Partner PaaS service creation, and binding service calls to corresponding calls on the Partner PaaS;

initiating creation, by the developer using the Proxy Service Broker, of an instance of a Partner PaaS service selected from the Service Catalog;

generating, by the Proxy Service Broker, a unique service identifier for the instance of the Partner PaaS service to avoid name clashes on the Partner PaaS;

transmitting, using the Proxy Service Broker, a call to a Partner Service Broker on the Partner PaaS to create the instance of the Partner PaaS service executing on the Partner PaaS;

deploying, by the developer, an Application on the Hoster PaaS to consume the instance of the Partner PaaS service;

binding, by the developer, the Application deployed on the Hoster PaaS to the instance of the Partner PaaS service executing on the Partner PaaS; and directly consuming the Partner PaaS service executing on the Partner PaaS and bound to the Application deployed on the Hoster PaaS by using Hoster PaaS consumer credentials and without requiring Partner PaaS consumer credentials.

14. The computer-implemented system of claim 13, wherein the Service Catalog of PaaS services is stored on and returned by the Proxy Service Broker.

15. The computer-implemented system of claim 13, wherein the Proxy Service Broker is associated with a Developer Space associated with the Hoster PaaS.

16. The computer-implemented system of claim 13, further configured to transmit, using the Proxy Service Broker, a call to the Partner Service Broker on the Partner PaaS to create a service key for the created instance of the Partner PaaS service.

17. The computer-implemented system of claim 16, wherein:
a single service user is used to transmit the call to create the instance of the Partner PaaS service and to create the service key for the created instance of the Partner PaaS service; and
the calls to the Partner PaaS from the Proxy Service Broker are Representational State Transfer (REST) calls.

* * * * *